United States Patent
Ballantine et al.

(10) Patent No.: US 7,026,065 B2
(45) Date of Patent: Apr. 11, 2006

(54) FUEL CELL SYSTEM HEAT RECOVERY

(75) Inventors: Arne W. Ballantine, Round Lake, NY (US); Ryan Hallum, Latham, NY (US)

(73) Assignee: Plug Power Inc., Latham, NY (US)

( * ) Notice: Subject to any disclaimer, the term of this patent is extended or adjusted under 35 U.S.C. 154(b) by 326 days.

(21) Appl. No.: 10/232,431

(22) Filed: Aug. 30, 2002

(65) Prior Publication Data

US 2003/0044663 A1 Mar. 6, 2003

Related U.S. Application Data

(60) Provisional application No. 60/316,383, filed on Aug. 31, 2001.

(51) Int. Cl.
*H01M 8/04* (2006.01)
*H01M 8/06* (2006.01)

(52) U.S. Cl. .......................... 429/26; 429/34

(58) Field of Classification Search .................. 429/26, 429/34

See application file for complete search history.

(56) References Cited

U.S. PATENT DOCUMENTS

| | | | |
|---|---|---|---|
| 3,718,506 A * | 2/1973 | Fischer et al. | 429/24 |
| 6,630,264 B1 * | 10/2003 | Haltiner et al. | 429/32 |
| 6,797,421 B1 * | 9/2004 | Assarabowski et al. | 429/26 |
| 2004/0096715 A1 * | 5/2004 | Herdtle et al. | 429/26 |

FOREIGN PATENT DOCUMENTS

DE 19948214 A1 * 4/2000

* cited by examiner

*Primary Examiner*—Tracy Dove
(74) *Attorney, Agent, or Firm*—Trop, Pruner & Hu, P.C.

(57) ABSTRACT

The invention provides a fuel cell incorporating a thermal management scheme and associated methods of operation. In one aspect, a fuel cell system includes a frame enclosing a fuel cell, a coolant flow circuit and a heat exchanger. The frame has at least one external panel mounted thereon to enclose the fuel cell, a coolant circuit and heat exchanger. The coolant flow circuit is adapted to circulate a coolant through the heat exchanger and across a surface of the fuel cell to provide heat transfer between the fuel cell and the heat exchanger. An inlet orifice and an outlet orifice are coupled to the frame and to the heat exchanger, and are adapted to provide an export flow circuit from the inlet orifice through the heat exchanger to the outlet orifice. An insulating material is fixed to a surface of the external panel.

11 Claims, 4 Drawing Sheets

FUEL CELL SYSTEM HEAT RECOVERY

CROSS REFERENCE TO RELATED APPLICATIONS

This application claims priority under 35 USC 119(e) from U.S. Provisional Application No. 60/316,383, filed Aug. 31, 2001, naming Ballantine et al. as inventors, and titled "FUEL CELL SYSTEM HEAT RECOVERY." That application is incorporated herein by reference in its entirety and for all purposes.

BACKGROUND

The invention generally relates to a fuel cell system heat recovery device and method that retains heat energy and increases efficiency.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \qquad (1)$$

at the anode of the cell, and

$$O_2 + 4H^+ + 4e^- \rightarrow 2H_2O \qquad (2)$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nafion™, Gore Select™, sulphonated fluorocarbon polymers, and other materials such as polybenzimidazole (PBI) and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cell systems generally include various sources of heat, such as from fuel processing systems, the fuel cell stack itself, exhaust gas oxidizers, etc. In particular, the exhaust from a fuel cell is generally oxidized to remove trace amounts of unreacted fuels before it is exhausted to ambient. Such exhaust is generally hot and saturated with water vapor from the fuel cell system and from combustion of combustible gas components in the exhaust. For a variety of reasons, it may be desirable to recover such heat from a fuel cell system. There is thus a continuing need for fuel cell system design and improvements associated with thermal management to address factors including the foregoing.

SUMMARY

The invention provides a fuel cell incorporating a thermal management scheme and associated methods of operation. In one aspect, a fuel cell system includes a frame enclosing a fuel cell, a coolant flow circuit and a heat exchanger. The frame has at least one external panel mounted thereon to enclose the fuel cell (e.g., a metal panel bolted to the frame), a coolant circuit and heat exchanger. The coolant flow circuit is adapted to circulate a coolant through the heat exchanger and across a surface of the fuel cell to provide heat transfer between the fuel cell and the heat exchanger. An inlet orifice and an outlet orifice are coupled to the frame and to the heat exchanger, and are adapted to provide an export flow circuit from the inlet orifice through the heat exchanger to the outlet orifice. An insulating material (e.g., foam rubber) is fixed to a surface of the external panel. The coolant generally must a dielectric fluid such as de-ionized water to avoid shorting out the fuel cell as it passes through. Other coolants typically used include de-ionized glycol (non-conductive) or dielectric organic compounds such as Therminol™.

As an example, the export flow circuit can be a circuit through which an external fluid such as water from a hot water tank can be circulated through the system to remove heat from the heat exchanger and thereby from the system. The system enclosure is insulated (e.g., with material having an R-Value greater than 1, or greater than 5, as examples) to lower the amount of system heat that is rejected to ambient, and the system efficiency is thereby increased as additional heat is provided to an external combined heat and power (CHP) application such as a water tank. Other CHP applications may also be employed to utilize the waste heat from the system.

In some embodiments, the inlet and outlet orifices are each adapted to removeably mate with a conduit. For example, a system can be provided that is easy to connect to a CHP application. Such CHP applications (such as heating a water tank or providing heat to an HVAC system) may not be integrated into the system enclosure, and it may be desirable to simplify the integration process, for example, by allowing connection to the inlet and outlet orifices without having to disassemble panels from the system enclosure. It may also be desirable that such connections to the inlet and outlet orifices be removeable. In some embodiments, the inlet and outlet orifices are each at least one of a threaded male pipe fitting, a threaded female pipe fitting or a quick-connect pipe fitting (e.g., a fitting held in place with springs, referred to as a "quick connect" or "spring secured" fitting). Such commercial plumbing fittings are well known.

In some embodiments, the heat exchanger is a plate heat exchanger having a first flow circuit adapted to receive the coolant, and having a second flow circuit adapted to receive a fluid from the export flow circuit. Other heat exchanger arrangements are possible, such as shell and tube heat exchangers, etc. In general, such heat exchangers will operate in a similar manner, i.e., by transferring heat from one side of a heat conducting surface contacted with a relatively hot fluid, to an opposite side of the surface contacted with a relatively cool fluid.

Some embodiments may further include a fuel processing reactor enclosed in the frame and adapted to provide hydrogen to the fuel cell, wherein the coolant circuit is coupled to a surface of the fuel processing reactor and adapted to remove heat from the fuel processing reactor. Similarly, in other embodiments, a fuel processing reactor may be enclosed in the frame and adapted to provide hydrogen to the fuel cell, and a second coolant circuit may be coupled to a surface of the fuel processing reactor, the second coolant circuit being further coupled to the heat exchanger and being adapted to transfer heat from the fuel processing reactor to the heat exchanger. In the context of this invention, the term "coupled" is used generically to refer to any direct or indirect connection between components. In the case of an indirect connection, for example, an additional component or components may also be present between the components that are "coupled."

In some embodiments, the heat exchanger is a plate heat exchanger having a first flow circuit adapted to receive the coolant, and having a second flow circuit adapted to receive a fluid from the export flow circuit, and having a third flow circuit adapted to receive a fluid from the second coolant circuit. As an example, the export flow circuit can be adapted to receive heat from the first flow circuit and then from the second flow circuit.

In another aspect, the invention provides a fuel cell system including a fuel cell system enclosed in a housing, wherein an insulating material is fixed to at least one surface of the housing. The fuel cell system includes a heat exchanger adapted to transfer heat from the fuel cell system to a first coolant. The housing includes an inlet orifice adapted to receive a flow of a second coolant from a source outside the housing, wherein the inlet orifice is coupled to the heat exchanger, wherein the heat exchanger is coupled to an outlet orifice located on the housing, and wherein the outlet orifice is adapted to expel the second coolant from the housing. Embodiments may be provided of such systems including any of the features of aspects described herein, either alone or in combination.

In another aspect, the invention provides a method of operating a fuel cell system, including at least the following steps: (1) operating a fuel cell in an insulated enclosure; (2) circulating a first coolant between a surface of the fuel cell and a surface of a heat exchanger to transfer heat from the fuel cell to the heat exchanger; and (3) circulating a second coolant through the heat exchanger to remove heat from the heat exchanger, wherein the second coolant is injected into the insulated enclosure through an inlet orifice located on the enclosure, and wherein the second coolant is exhausted from the enclosure through an outlet orifice located on the enclosure.

In some embodiments, additional steps may include: (1) operating a fuel processing reactor in the enclosure to provide hydrogen to the fuel cell; (2) circulating a third coolant across a surface of the fuel processing reactor to remove heat from the fuel processing reactor; and (3) circulating the third coolant through the heat exchanger to transfer heat from the third coolant to the heat exchanger.

In another aspect, the invention provides a frame set for a fuel cell system, including a frame adapted to enclose a fuel cell, a coolant flow circuit and a heat exchanger. The frame is adapted to receive at least one external panel mounted thereon to enclose an interior space of the frame. The coolant flow circuit is adapted to circulate a coolant through the heat exchanger and across a surface of the fuel cell to provide heat transfer between the fuel cell and the heat exchanger. An inlet orifice and an outlet orifice are coupled to the frame and the heat exchanger, and are adapted to provide an export flow circuit from the inlet orifice through the heat exchanger to the outlet orifice. An insulating material is fixed to a surface of the external panel (e.g., having an R-value greater than 1, or greater than 5).

In some embodiments, the inlet and outlet orifices are each adapted to removeably mate with a conduit. As an example, the inlet and outlet orifices can each be at least one of a threaded male pipe fitting, a threaded female pipe fitting or a quick-connect pipe fitting.

In another aspect, the invention provides a removable enclosure panel for a fuel cell system. The panel is adapted to be mounted onto a frame enclosing a fuel cell system. An insulating material mounted to the panel such that the R-value is greater than 1 with respect to heat transfer through the combined panel and insulating material.

Other embodiments of such methods may include any of the features, aspects or steps described herein, either alone or in combination. Advantages and other features of the invention will become apparent from the following description, drawing and claims.

DETAILED DESCRIPTION

Figure 1:
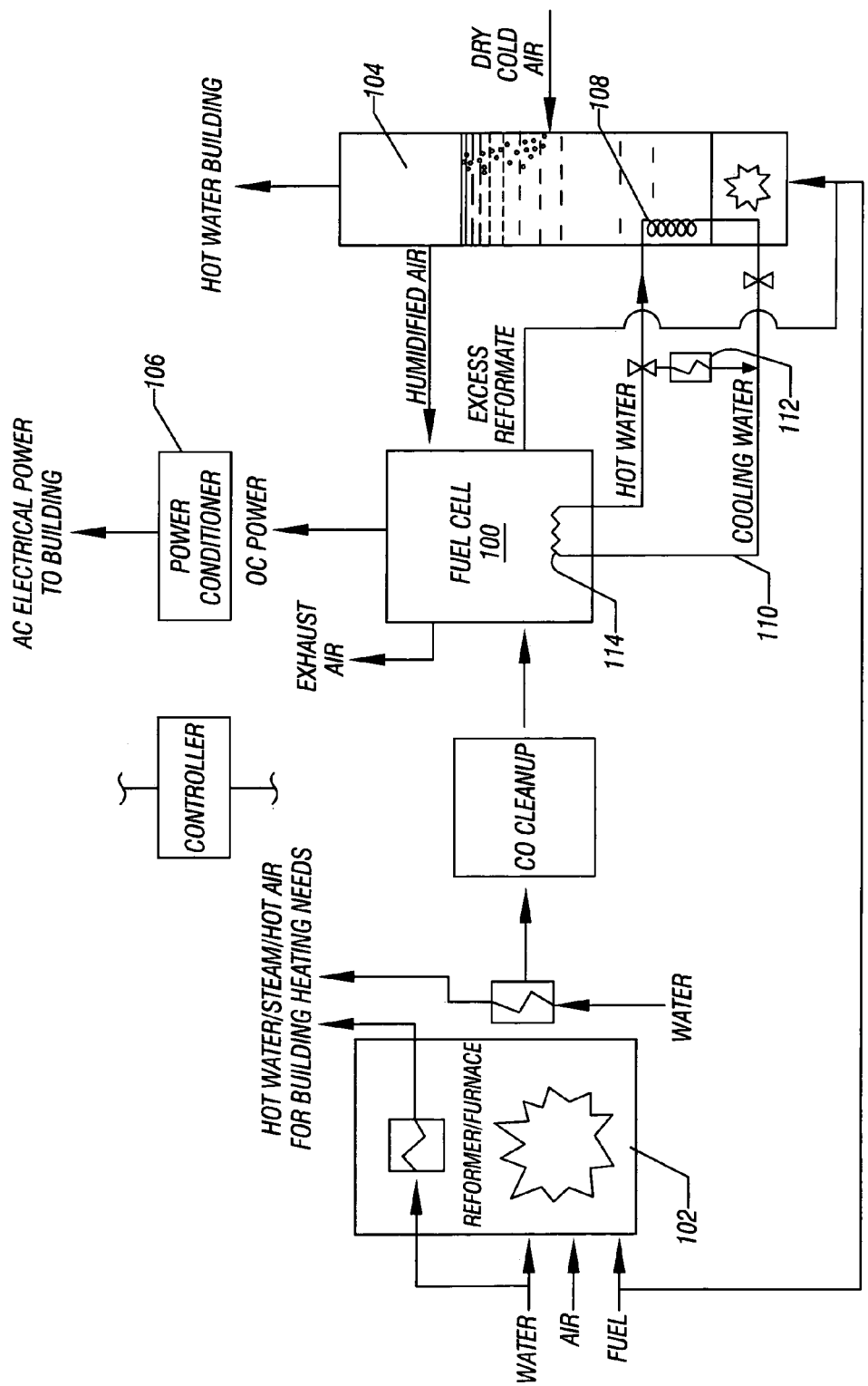
FIG. 1 shows a schematic diagram of a fuel cell system.

Referring to FIG. 1, a typical combined heat and power fuel cell system is shown. A fuel cell system 100 receives fuel from a reformer 102 and reacts the fuel with humidified air from a hot water tank 104. The fuel cell system 100 provides power to a building via power conditioner 106. The fuel cell system also provides heat to the water tank 104 via heat exchanger 108, which is located inside the water tank 104. A coolant is circulated through the fuel cell stack (indicated at 114) and the heat exchanger 108 via coolant loop 110. Unlike embodiments under the present invention, no radiator is provided, such that all excess heat is removed from the fuel cell system 100 via coolant loop 110. The temperature of the water tank 104 is regulated by the heat exchanger 112.

Figure 2:
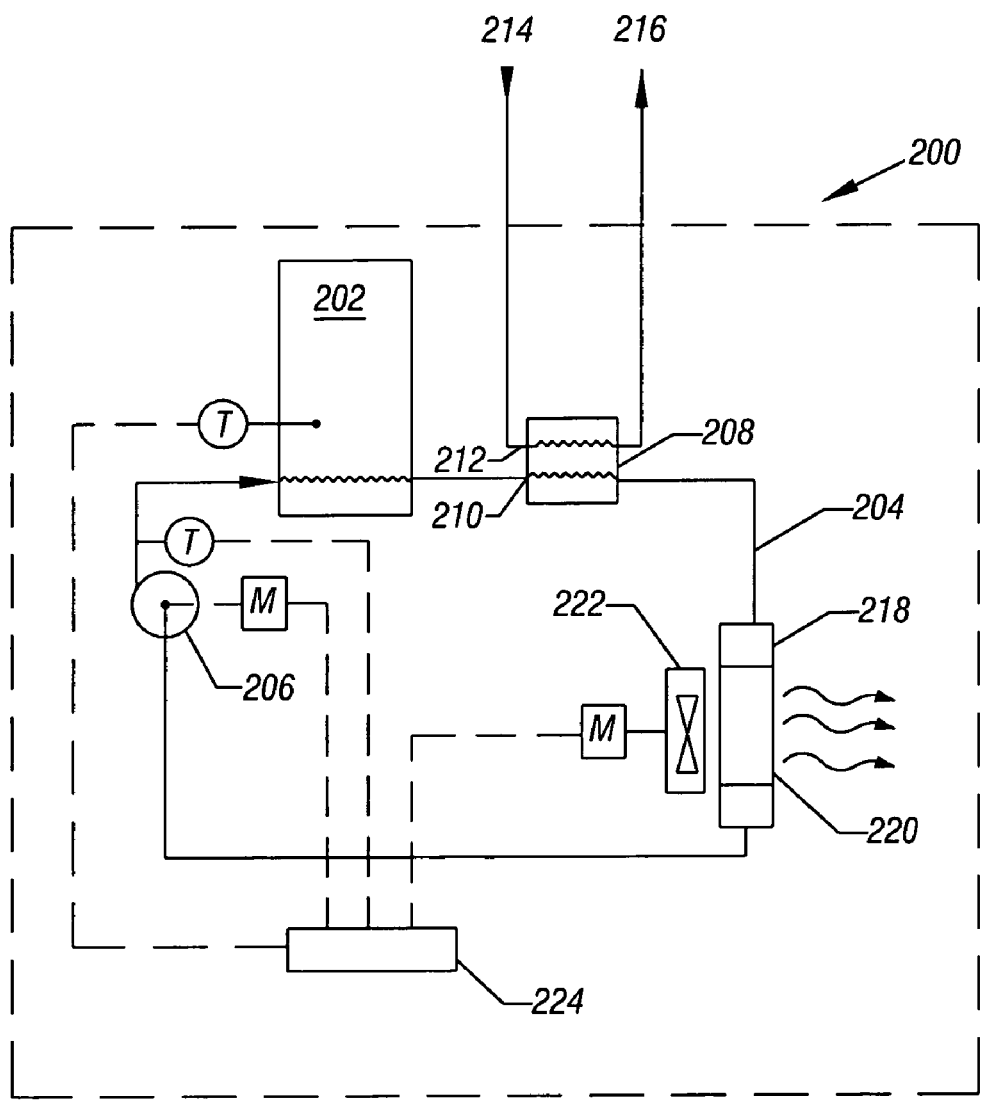
FIG. 2 shows a schematic diagram of a fuel cell system.

Referring to FIG. 2, a thermal management system 200 is provided for a fuel cell system. A fuel cell stack 202 is connected to a coolant loop 204. As an example, the stack may be a low temperature PEM system utilizing sulphonated fluorocarbon PEM operated at about 70–80° C., or the stack can be a PBI PEM system operated at a higher temperature range (e.g., about 160° C. Pump 206 circulates a coolant through the stack 202 to remove excess heat. The coolant loop 204 includes a heat exchanger 208 to remove heat from the coolant. The coolant flows through a first conduit 210 of the heat exchanger 208. The first conduit is adapted to transfer heat to a fluid flowed through second conduit 212, having an inlet 214 and an outlet 216. The coolant loop 204 includes a radiator system 218, that includes a heat exchanger 220 and a fan 222 adapted to blow air through the heat exchanger 220. The system 200 also includes a controller 224 adapted to actuate the fan 222 and the pump 206. In the embodiment shown in FIG. 2, the controller is further adapted to measure the temperature of the stack 202, and the temperature of the coolant in the coolant loop 204 at a location between the pump 206 and the stack 202.

As previously described, the controller 224 maintains the temperature of the coolant in the coolant loop 204 above a predetermined threshold by operating the fan 222 associated with the radiator system 218. Some embodiments may include a bypass system for bypassing the coolant around the heat exchanger 208 to prevent the removal of too much heat from the coolant. Another system (not shown) that is external to system 200 independently regulates the flow of fluid through the second conduit 212 of heat exchanger 208. In some embodiments, the inlet 214 and outlet 216 associated with the second conduit 212 may be external connectors that are provided on the housing of a fuel cell system (see FIG. 4).

While the air supply to fuel cell stack 202 is not shown, the air may be drawn from within the fuel cell cabinet, as disclosed in U.S. patent application Ser. No. 09/502,885, or from outside the fuel cell cabinet. It may also be desirable to filter the air drawn into the fuel cell system. For example, non-filtered air intake systems drawing air from within the fuel cell cabinet generally rapidly degrade the fuel cell performance with organic chemical vapors leaked or off-gassed from system components.

The operation of such an embodiment can also be described in terms of a method for operating the system. For example, such a method might include the following steps: (1) operating a fuel cell 202 in an insulated enclosure 200; (2) circulating a first coolant 204 between a surface of the fuel cell 202 and a surface of a heat exchanger 208 to transfer heat from the fuel cell 202 to the heat exchanger 208; and (3) circulating a second coolant through the heat exchanger 208 to remove heat from the heat exchanger 208, wherein the second coolant is injected into the insulated enclosure 200 through an inlet orifice 214 located on the enclosure 200, and wherein the second coolant is exhausted from the enclosure 200 through an outlet orifice 216 located on the enclosure 200.

Other embodiments of such methods may include any of the features, aspects or steps described herein, either alone or in combination. For example, in some embodiments, additional steps might include: (1) operating a fuel processing reactor in the enclosure to provide hydrogen to the fuel cell; (2) circulating a third coolant across a surface of the fuel processing reactor to remove heat from the fuel processing reactor; and (3) circulating the third coolant through the heat exchanger to transfer heat from the third coolant to the heat exchanger.

Figure 3:
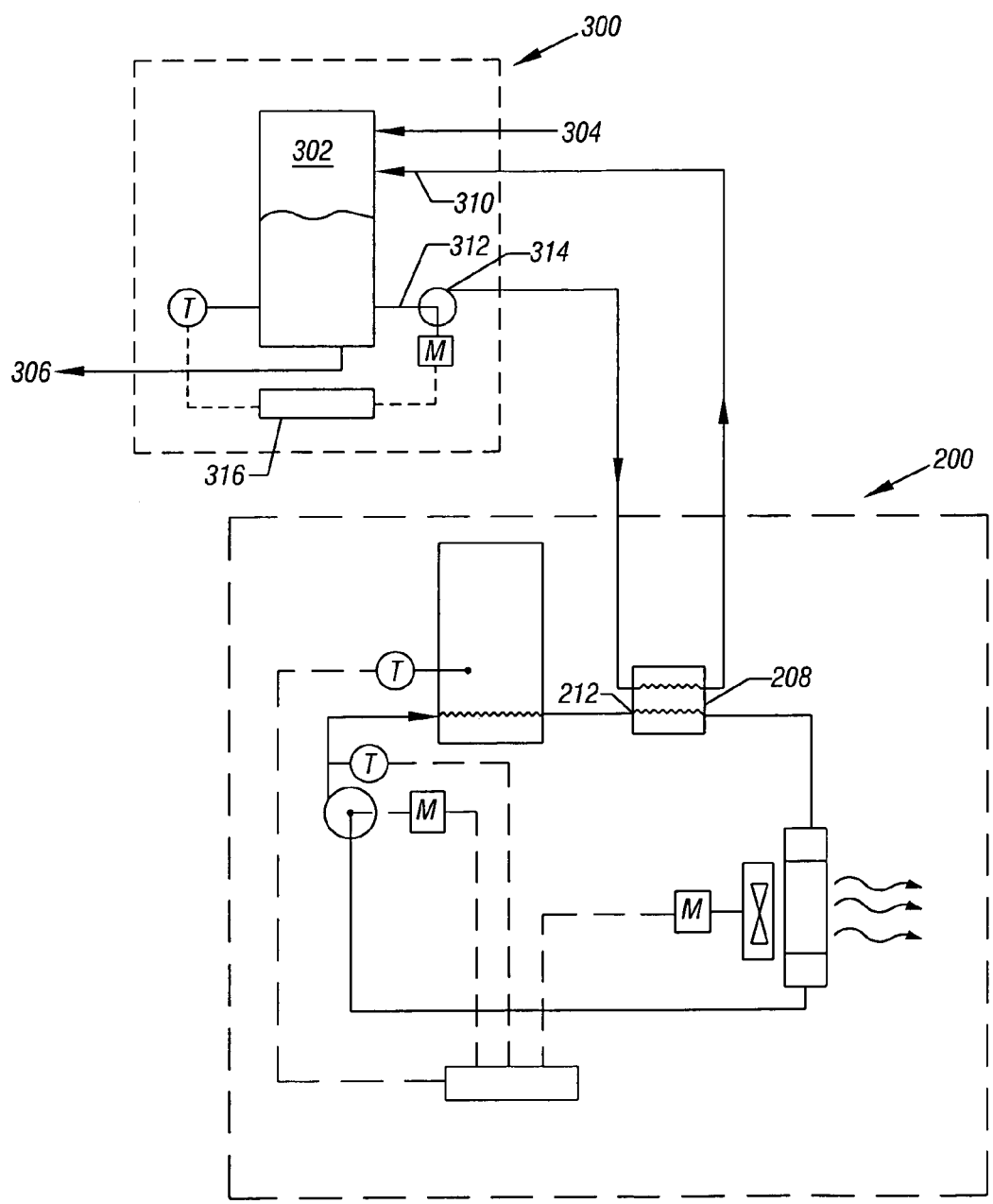
FIG. 3 shows a schematic diagram of a fuel cell system.

Referring to FIG. 3, the system of FIG. 2 is shown integrated with a system adapted to circulate a fluid through the second conduit 212 of the heat exchanger 208. The system 300 includes a water tank having an inlet 304 from a municipal water supply and an outlet 306 leading to a residence or a building (e.g., potable water supply or forced water radiator heating system). The water tank 302 also includes inlet 310 from system 200 and outlet 312 leading to system 200. The circulation of water between inlet 310 and outlet 312 is driven by pump 314, which is actuated by controller 316, which bases control of the pump 314 on the temperature of the tank 302. In some embodiments, the system 300 may further include a supplemental burner (not shown) to heat the water tank when heat from heat exchanger 208 is not available. Also, in some embodiments, the tank 302 may include a heat exchanger through which a fluid is circulated between inlet 310 and outlet 312. In this way, a closed fluid loop can serve to carry heat from system 200 to system 300.

Figure 4:
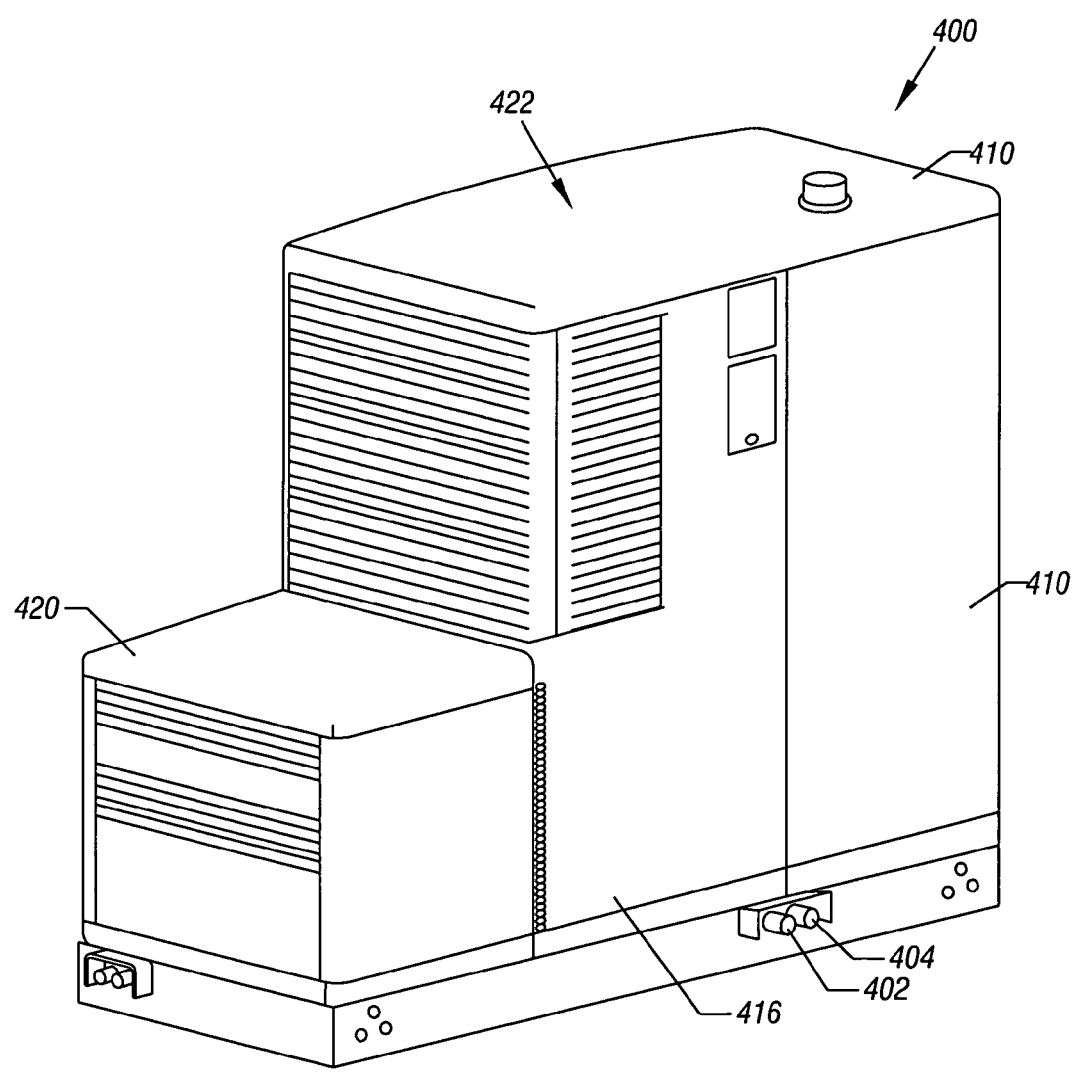
FIG. 4 shows a perspective view of a fuel cell system an exterior thermal management system.

Referring to FIG. 4, a housing 400 of a fuel cell system includes an inlet connector 402 and an outlet connector 404. Connectors 402 and 404 (referred alternatively as inlet and outlet orifices) provide access and fluid communication to a heat exchanger within the housing 400 that can provide heat to a fluid circulated through the connectors 402 and 404. The fluid circulation through connectors 402 and 404 can be referred to as an export flow circuit, referring to the exportation of heat from the system. For example, such a heat exchanger 208 is discussed with respect to FIG. 2. Housing 400 may have an internal frame, to which is attached a plurality of panels 410. In previous designs the panels have been constructed from sheet metal and/or steel. Construction of this type allowed heat loss through the housing 400. In order to provide an increase in efficiency, it has been discovered that by insulating panels 410, this heat loss can be significantly reduced and by insulating panels 410, overall system efficiency can be increased.

The housing 400 may also include a fuel processing reactor enclosed in the frame of the system that is adapted to provide hydrogen to the fuel cell. A coolant circuit can be coupled to a surface of the fuel processing reactor to transfer heat from the fuel processing reactor to the heat exchanger in the enclosure 400. As an example, the heat exchanger can be a plate heat exchanger having a first flow circuit adapted to receive the coolant, and having a second flow circuit adapted to receive a fluid from the export flow circuit. As an example, it may be desirable to transfer heat from the stack to a coolant flow, and then transfer additional heat into the coolant flow from the fuel processing system, which is generally at a higher temperature than the stack. In other cases, it may be desirable to use two separate coolant loops inside the enclosure to regulate the temperatures of the fuel cell stack and the fuel processor independently. In the latter case, the heat exchanger may have three inputs: one for the export flow circuit, and one for each of the internal coolant loops.

One function of thermal insulation, on panels 410, is to decrease the transfer of heat from the system to the outside environment. Heat may be transferred from a heat source (such as heat exchangers, plumbing, piping connections) to the heat receiver (outside environment) by one or more of the heat transfer modes: conduction, convection and radiation. As commonly known, conduction involves heat transfer due to interaction of atoms or molecules possessing a greater amount of kinetic energy with those possessing less. When the molecules are fixed in space, as in solid bodies, interaction of molecules responsible for thermal conduction arises from the elastic binding forces between the molecules. When the molecules are not fixed in space, as in gases or liquids, heat conduction is produced by the transfer of kinetic energy during molecular collisions.

Convection involves heat transfer by the actual movement of a fluid. When the fluid is free to move as in gases or liquids, portions of the fluid in contact with the heat source become hotter, expand, become less dense and rise. Their place is taken by the denser and colder portions of the fluid. This process generates natural convection currents that in gases at ordinary pressures are responsible for the major proportion of the heat that is transferred. The contribution of convection to the overall heat transfer in a gas can be reduced or eliminated by lowering the gas pressure. Lowering the pressure of a gas contained within a vessel reduces the number of molecules of the gas per unit volume. When the pressure level is reached at which the distance between the walls of the vessel is much smaller than the length of the mean free path of the gas molecules at the given conditions, the convection contribution is effectively eliminated.

Radiation involves the transfer of radiant energy from a source to the receiver. A solid body at any temperature above absolute zero radiates energy. This radiation is electromagnetic in nature and takes place without the necessity of an intervening medium. A part of the radiant energy impacting a receiver is absorbed and a part is reflected by it. The contribution by radiation to overall heat transfer can be reduced by interposing radiation shields between the heat source and the receiver, or by altering the absorptive or reflective properties of a body.

The contribution of each of the above modes to the overall heat transfer depends on the heat transfer medium as well as on the temperature and temperature differential between the heat source and the receiver. Under certain conditions, any one of the three modes may become controlling, while, under other conditions, the contribution of two or of all three modes of heat transfer may be significant. Combinations of panel component materials may be used to emphasize certain more desirable properties in the panels and to suppress other less undesirable ones. The resultant component thermal insulating panels provide better overall structural characteristics and thermal insulating properties than previous designs.

Thermal insulation is intended to reduce the contribution of all the modes of heat transfer to a practical minimum. Examples of thermal insulation include solid insulation panels made of low conductive materials, expanded foams, gas-filled or evacuated powders and fibrous materials, vacuum alone, opacified powders and multilayer insulations Thermal resistance, structural integrity and load-supporting capability are design characteristics which are taken into account. The selection of a specific type of insulation for a particular type of service is made on the basis of a compromise between factors such as effectiveness, cost, ruggedness, compatibility, applicable temperature range, aging factor and ease of application.

Sheet metal or steel panels lined with a gas-filled, closed-cell plastic foams e.g. polystyrene, polyurethane, polyisocyanurate, are among the most economic and efficient types of thermal insulation. They have been used for insulating freezers and refrigerators. Foam-type insulation has a cellular structure generated by the expansion of a foamable composition, often referred to as a foamable resin, plastic or polymer composition. It contains two phases, viz. a gas phase and a solid phase. The conductivity of foam insulation is determined by the sum of the heat flow through the gas contained within the cells and through the network of the plastic cell walls. The heat flow through the closed-cell foam insulation can be reduced by filling the cells with a low conductivity gas, by extending the length of the heat flow path through the solid phase, and by reducing the thickness of the cell walls.

Thermally insulted panels can be used to separate different compartments within the fuel cell system. For example excessive heat can reduce battery life, therefore if compartment 420 contained a battery to supplement load following characteristics of the fuel cell system, it could be insulated from the remainder of the system to maintain an efficient operating environment for the batteries, while retaining heat within compartment 422 increasing overall system efficiency.

R-Value is a measure of how well an insulation product resists the flow of heat or cold through it. R-Value is determined by a laboratory test in which an insulation material is sandwiched between a cool and warm surface. The ability of the material to resist temperature changes results in an R-Value for that material. R-Value is expressed in units of M^2K/W, where M^2 is the surface area of the insulating material, W is the amount of energy in Watts flowing across one side of the material, and K is the resulting temperature rise on the other side of the material. As examples, it may be preferable to insulate the enclosures of systems under the present invention with an insulation material having an R-Value greater than 1, or greater than 5, as examples, or to insulate the panels such that the insulated panels themselves exhibit such heat retention properties with respect to the temperature differential between the inside and outside of the system.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

What is claimed is:

1. A fuel cell system, comprising:
    a frame enclosing a fuel cell, a coolant flow circuit and a heat exchanger, the frame having at least one external panel mounted thereon to enclose the fuel cell, coolant circuit and heat exchanger;
    wherein the coolant flow circuit is adapted to circulate a coolant through the heat exchanger and across a surface of the fuel cell to provide heat transfer between the fuel cell and the heat exchanger;
    an inlet orifice and an outlet orifice, the inlet and outlet orifices being coupled to the frame, the inlet and outlet orifices being coupled to the heat exchanger, the inlet and outlet orifices being adapted to provide an export flow circuit from the inlet orifice through the heat exchanger to the outlet orifice;

wherein an insulating material is fixed to a surface of the external panel;

a fuel processing reactor enclosed in the frame and adapted to provide hydrogen to the fuel cell; and a second coolant circuit coupled to a surface of the fuel processing reactor, the second coolant circuit being further coupled to the heat exchanger, the second coolant circuit being adapted to transfer heat from the fuel processing reactor to the heat exchanger.

2. The fuel cell system of claim 1, wherein the insulating material has an R-Value of greater than 1 M^2K/W.

3. The fuel cell system of claim 1, wherein the insulating material has an R-Value of greater than 5 M^2K/W.

4. The fuel cell system of claim 1, wherein the export flow circuit comprises water circulated through the heat exchanger from a water tank located outside the frame.

5. The fuel cell system of claim 1, wherein the inlet and outlet orifices are each adapted to removeably mate with a conduit.

6. The fuel cell system of claim 1, wherein the inlet and outlet orifices are each at least one of a threaded male pipe fitting, a threaded female pipe fitting or a quick-connect pipe fitting.

7. The fuel cell system of claim 1, wherein the panel is metal.

8. The fuel cell system of claim 1, wherein the heat exchanger is a plate heat exchanger having a first flow circuit adapted to receive the coolant, and having a second flow circuit adapted to receive a fluid from the export flow circuit.

9. The fuel cell system of claim 1, further comprising:

a fuel processing reactor enclosed in the frame and adapted to provide hydrogen to the fuel cell, wherein the coolant circuit is coupled to a surface of the fuel processing reactor and adapted to remove heat from the fuel processing reactor.

10. The fuel cell system of claim 9, wherein the heat exchanger is a plate heat exchanger having a first flow circuit adapted to receive the coolant, and having a second flow circuit adapted to receive a fluid from the export flow circuit, and having a third flow circuit adapted to receive a fluid from the second coolant circuit.

11. The fuel cell system of claim 10, wherein the export flow circuit is adapted to receive heat from the first flow circuit and then from the second flow circuit.

* * * * *